United States Patent
Haga et al.

(10) Patent No.: US 7,370,549 B2
(45) Date of Patent: May 13, 2008

(54) REDUCTION GEAR FOR GEARED MOTOR, GEARED MOTOR, AND PRODUCT GROUP THEREOF

(75) Inventors: Takashi Haga, Ohbu (JP); Mitsuhiro Tamura, Aichi (JP)

(73) Assignee: Sumitomo Heavy Industries, Ltd., Shinagawa-ku, Tokyo (JP)

( * ) Notice: Subject to any disclaimer, the term of this patent is extended or adjusted under 35 U.S.C. 154(b) by 120 days.

(21) Appl. No.: 10/393,362

(22) Filed: Mar. 21, 2003

(65) Prior Publication Data
US 2004/0012282 A1    Jan. 22, 2004

(30) Foreign Application Priority Data

Mar. 22, 2002    (JP)    ............................. 2002-081739
Mar. 27, 2002    (JP)    ............................. 2002-088678

(51) Int. Cl.
*F16H 3/44* (2006.01)
(52) U.S. Cl. .................. 74/416; 74/413; 74/421 A; 74/606 R
(58) Field of Classification Search ................ 74/413, 74/414, 606 R
See application file for complete search history.

(56) References Cited

U.S. PATENT DOCUMENTS

| | | | | | |
|---|---|---|---|---|---|
| 2,176,207 | A | * | 10/1939 | Christensen | ............... 74/606 R |
| 2,600,912 | A | * | 6/1952 | Olson | ........................ 74/421 R |
| 2,868,031 | A | * | 1/1959 | Schumb | ........................ 74/425 |
| 3,987,692 | A | * | 10/1976 | Lesner et al. | ............... 81/57.13 |
| 4,122,730 | A | * | 10/1978 | Weiland | ..................... 74/606 R |
| 4,171,651 | A | * | 10/1979 | Dacunto | ..................... 81/57.29 |
| 4,179,955 | A | * | 12/1979 | Akiyoshi et al. | ........... 81/57.11 |
| 4,185,514 | A | * | 1/1980 | Edwards | ........................ 74/425 |
| 4,287,795 | A | * | 9/1981 | Curtiss | ........................ 81/57.26 |
| 4,671,125 | A | * | 6/1987 | Yabunaka | ..................... 74/7 E |
| 4,827,810 | A | * | 5/1989 | Rushanan | ................... 81/57.29 |
| 5,013,954 | A | * | 5/1991 | Shibaike et al. | ............ 310/309 |
| 5,339,707 | A | * | 8/1994 | Arbus | ....................... 74/606 R |
| 5,463,914 | A | * | 11/1995 | Tyan | ............................ 74/661 |
| 5,533,825 | A | * | 7/1996 | Stone | ....................... 403/359.6 |
| 5,782,133 | A | * | 7/1998 | Kullborg | ...................... 74/420 |
| 6,205,877 | B1 | * | 3/2001 | Vilain | .......................... 74/413 |
| 6,234,037 | B1 | * | 5/2001 | Zimmer | .................... 74/421 A |
| 6,397,691 | B1 | * | 6/2002 | Greene | ........................ 74/89.2 |

FOREIGN PATENT DOCUMENTS

| | | |
|---|---|---|
| JP | 5-61555 | 8/1993 |
| JP | 10-299840 | 11/1998 |

* cited by examiner

*Primary Examiner*—William C. Joyce
(74) *Attorney, Agent, or Firm*—Squire, Sanders & Dempsey, L.L.P.

(57) ABSTRACT

A reduction gear for forming a geared motor having a motor and a reduction gear is provided. The reduction gear for a geared motor includes an intermediate orthogonal gear head having an orthogonal transfer mechanism for changing a rotational direction of power delivered from the motor into an orthogonal direction and houses the orthogonal transfer mechanism in a separate intermediate casing. The reduction gear further includes a rear stage parallel gear head having a parallel shaft reduction mechanism including an output shaft serving as a final output shaft of the geared motor when the geared motor is formed, the rear stage parallel gear head being capable of directly connecting to a rear stage of the intermediate orthogonal gear head, with the parallel shaft reduction mechanism being housed in a separate rear stage casing.

26 Claims, 16 Drawing Sheets

REDUCTION GEAR FOR GEARED MOTOR, GEARED MOTOR, AND PRODUCT GROUP THEREOF

BACKGROUND OF THE INVENTION

1. Field of the Invention

The present invention relates to a reduction gear, a geared motor, and a product group thereof for use with industrial and transportation machinery and so forth.

2. Description of the Related Art

Conventionally it is known a reduction gear of an orthogonal or parallel shaft type for reducing power delivered from a motor or the like or for changing its rotational direction. In general, a motor is combined with the orthogonal shaft type reduction gear to change the rotational direction of power delivered from the motor, or with the parallel shaft type reduction gear to reduce only the speed thereof.

Alternatively, when the rotational direction needs to be changed and the speed needs to be reduced at the same time, a geared motor may be constructed in a combination of a motor and a reduction gear in which both the orthogonal transfer mechanism and the parallel shaft reduction mechanism are housed in one casing.

Although gear transfer mechanisms, friction transfer mechanisms or the like are available as reduction means for use with reduction gears, the gear transfer mechanism is employed mostly because the gear transfer mechanism can reduce the size of the resulting system and the cost thereof.

However, to construct a geared motor using prior art reduction gears, a separate (independent) reduction gear has been combined with a motor. Therefore, a variety of reduction gears to be prepared has required, for example, according to the size, type, use of the motor.

This has raised a stock cost of the reduction gear for reduction gear manufactures, and has raised a purchase price of the reduction gear for reduction gear users. The reduction gear users also needed to buy a new geared motor each time a slight change in use situation was made.

Furthermore, for gear arrangement convenience in the reduction gear, input and output shafts were restrictively positioned, resulting in a restricted position (or direction) for attachment of the reduction gear. Thus, the reduction gear could not be said to meet user needs (or user usability).

SUMMARY OF THE INVENTION

The present invention was developed to solve these problems. It is therefore an object of the present invention to facilitate the selective combination of a reduction gear and a motor, which can be used flexibly and reasonably according to its application.

The present invention solves the aforementioned problems by providing a reduction gear for forming a geared motor having a motor and a reduction gear. The reduction gear for a geared motor includes an intermediate orthogonal gear head having an orthogonal transfer mechanism for changing a rotational direction of power delivered from the motor into an orthogonal direction, the intermediate orthogonal gear head housing the orthogonal transfer mechanism in a separate intermediate casing. The reduction gear for a geared motor further includes a rear stage parallel gear head having a parallel shaft reduction mechanism including an output shaft serving as a final output shaft of the geared motor when the geared motor is formed, the rear stage parallel gear head being capable of directly connecting to a rear stage of the intermediate orthogonal gear head, with the parallel shaft reduction mechanism being housed in a separate rear stage casing.

That is, the intermediate orthogonal gear head having the orthogonal transfer mechanism can be coupled to the rear stage parallel gear head having the parallel shaft reduction mechanism, thereby making it possible to change the rotational direction of power delivered from the motor into an orthogonal direction and reduce the rotational speed. In this arrangement, since each gear head is formed in a separate casing, it is possible to use the intermediate orthogonal gear head itself as a reduction gear for performing orthogonal transfer or the rear stage parallel gear head itself as a reduction gear for performing parallel shaft speed reduction, respectively.

Various modifications can be made to the present invention and will be detailed later.

It is also possible to provide a geared motor having the aforementioned effects by integrally coupling these reduction gears and motors to each other.

Such geared motors would offer a much greater advantage when provided in a product group which has multiple types of at least one of the motor, the intermediate orthogonal gear head, and the rear stage parallel gear head and allows one of the multiple types to be selectively replaceable.

The geared motor provided in a product group allows the user to replace either the motor, the intermediate orthogonal gear head, or the rear stage parallel gear head as required with the other components remaining unchanged, thereby making it possible to reduce delivery lead times and product stocks as well as development cost and the price of the reduction gear.

A geared motor product group can include only the motor and the rear stage parallel gear head or only the motor and the intermediate orthogonal gear head, thereby providing various types of respective parallel shaft geared motors and orthogonal shaft geared motors according to user needs.

DESCRIPTION OF THE PREFERRED EMBODIMENTS

Now, the present invention will be explained below in more detail with reference to the accompanying drawings in accordance with embodiments.

Figure 1:
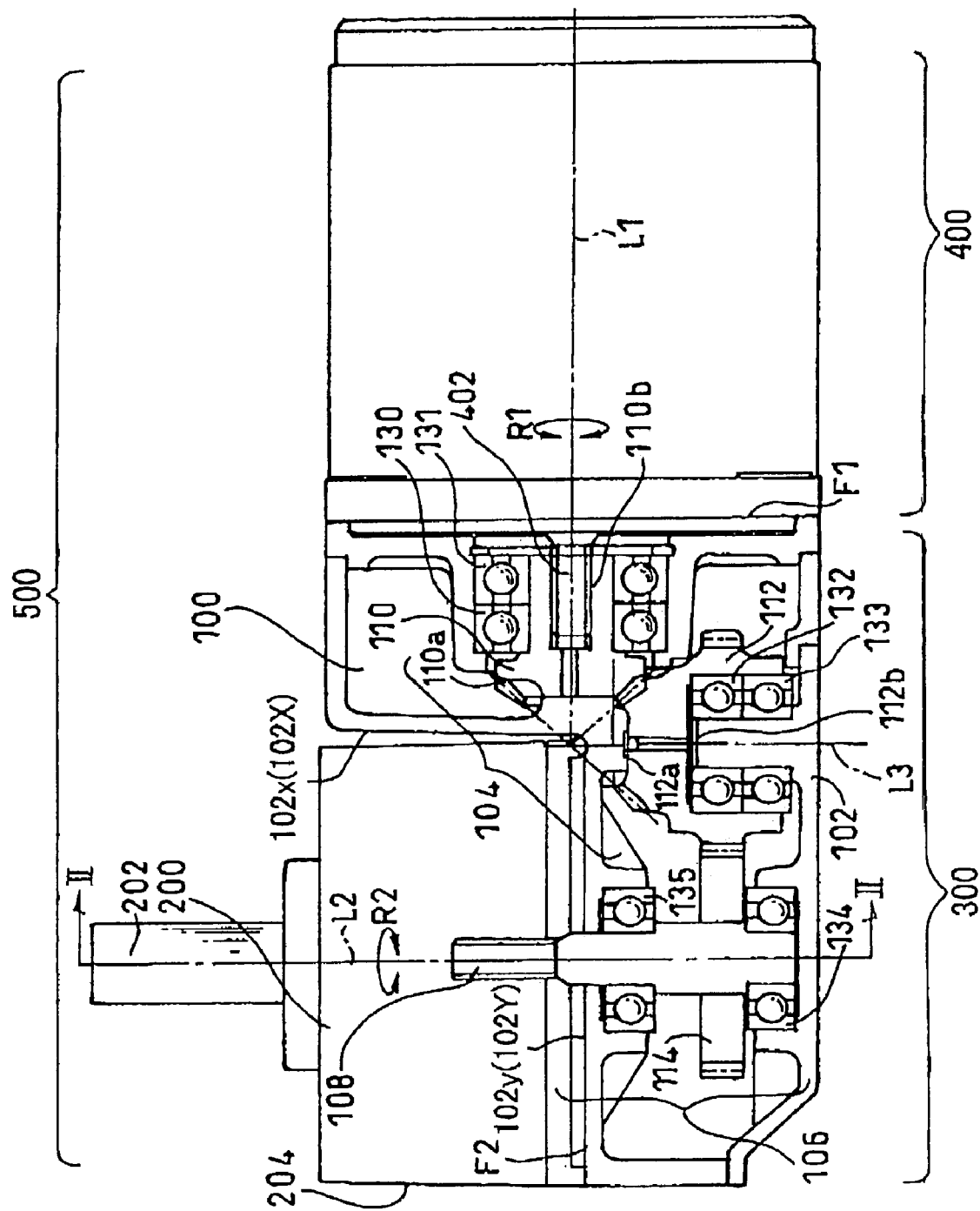
FIG. 1 is a cross-sectional side view showing a geared motor according to an embodiment of the present invention.

FIG. 1 is a cross-sectional view showing a geared motor 500 incorporating a reduction gear for use therewith according to the present invention. The geared motor 500 includes a motor 400 and a reduction gear 300, which includes an intermediate orthogonal gear head 100 and a rear stage parallel gear head 200.

On an attachment face F1 between the motor 400 and the intermediate orthogonal gear head 100, the intermediate orthogonal gear head 100 can be attached to the motor 400 at any one of the positions separated at angular intervals of 90 degrees about an output shaft (hereinafter simply referred to as the "motor shaft") 402 of the motor 400 along the circumferential direction R1 of the motor shaft 402. The motor 400 and the intermediate orthogonal gear head 100 are coupled to each other with bolts (not shown).

Furthermore, on an attachment face F2 between the intermediate orthogonal gear head 100 and the rear stage parallel gear head 200, the rear stage parallel gear head 200 can be attached to the intermediate orthogonal gear head 100 at any one of the positions separated at angular intervals of 90 degrees about an output shaft (hereinafter simply referred to as the "intermediate output shaft") 108 of the intermediate orthogonal gear head 100 along the circumferential direction R2 of the intermediate output shaft 108. The intermediate orthogonal gear head 100 and the rear stage parallel gear head 200 are coupled to each other with bolts (not shown).

The cross-section of an intermediate casing 102 including the input and output shaft lines L1, L2 of the intermediate orthogonal gear head 100 is formed in the shape of a letter L, while a main body (a portion excluding integrated projections on the like) of a rear stage casing 204 of the rear stage parallel gear head 200 is accommodated in a space defined by both casing faces 102X and 102Y which include the L-shaped sides 102x and 102y of the intermediate casing 102. Incidentally, it is allowed that at least part of the rear stage casing 204 is accommodated in the space.

In addition, the connection size at the attachment face F1 between the motor 400 and the intermediate orthogonal gear head 100 is designed to be the same as that at the attachment face F2 between the intermediate orthogonal gear head 100 and the rear stage parallel gear head 200. More specifically, the intermediate orthogonal gear head 100 and the motor 400 have generally the same diagonal size, with their attachment bolt holes (not shown) provided at the same respective positions (corresponding to the apexes of a square in the vicinity of the corner of the attachment face F1). On the other hand, the intermediate orthogonal gear head 100 and the rear stage parallel gear head 200 also have their attachment bolt holes (not shown) provided at the same respective positions (corresponding to the apexes of a square in the vicinity of the corner of the attachment face F2). In other words, the motor 400 and the rear stage parallel gear head 200 have their connection sizes that allow them to engage with each other, thereby making it possible for the rear stage parallel gear head 200 to be directly coupled to the motor 400.

The intermediate orthogonal gear head 100 has an orthogonal transfer mechanism 104 for changing the rotational direction of the power delivered by the motor 400 into a direction orthogonal thereto and an intermediate parallel shaft reduction mechanism 106 for reducing the speed of the rotational output from the orthogonal transfer mechanism 104. These mechanisms 104 and 106 are housed within the single intermediate casing 102.

The orthogonal transfer mechanism 104 includes a first intermediate gear 110 and a second intermediate gear 112 in a bevel gear design.

The first intermediate gear 110 is rotationally supported by bearings 130 and 131, and rotates about the input shaft line L1 of the intermediate orthogonal gear head 100.

On the other hand, the second intermediate gear 112 is rotationally supported by bearings 132 and 133, and orthogonally engages with the first intermediate gear 110 at one end 112a thereof and is attached in a cantilever manner to the intermediate casing 102 of the intermediate orthogonal gear head 100 at the other end 112b.

One end 110a of the first intermediate gear 110 and the end 112a of the second intermediate gear 112 are each in contact with the intermediate casing 102.

Furthermore, the first intermediate gear 110 is provided with a hole 110b into which the motor shaft 402 is inserted along the shaft line L1, wherein the inside of the hole 110b is provided with helical female splines for the first intermediate gear 110 to be coupled to the motor shaft 402.

The first intermediate gear 110 and the second intermediate gear 112, made of plastics, have self-lubricating properties.

On the other hand, the intermediate parallel shaft reduction mechanism 106 in the intermediate orthogonal gear head 100 has the intermediate output shaft 108 and a third intermediate gear 114 which rotate about the shaft line L2.

The intermediate output shaft 108 is rotationally supported by bearings 134 and 135, wherein the shaft line L2 of the intermediate output shaft 108 is perpendicular to the shaft line L1 of the first intermediate gear 110 of the orthogonal transfer mechanism 104 in the same plane, and parallel to a shaft line L3 of the second intermediate gear 112 in the same plane.

The intermediate output shaft 108 is also provided with helical splines in the same module as that of the motor shaft 402.

The third intermediate gear 114, attached to the intermediate output shaft 108, engages with the second intermediate gear 112 of the orthogonal transfer mechanism 104 on the outer circumference thereof and rotates about the same shaft line L2 as that of the intermediate output shaft 108.

Figure 2:
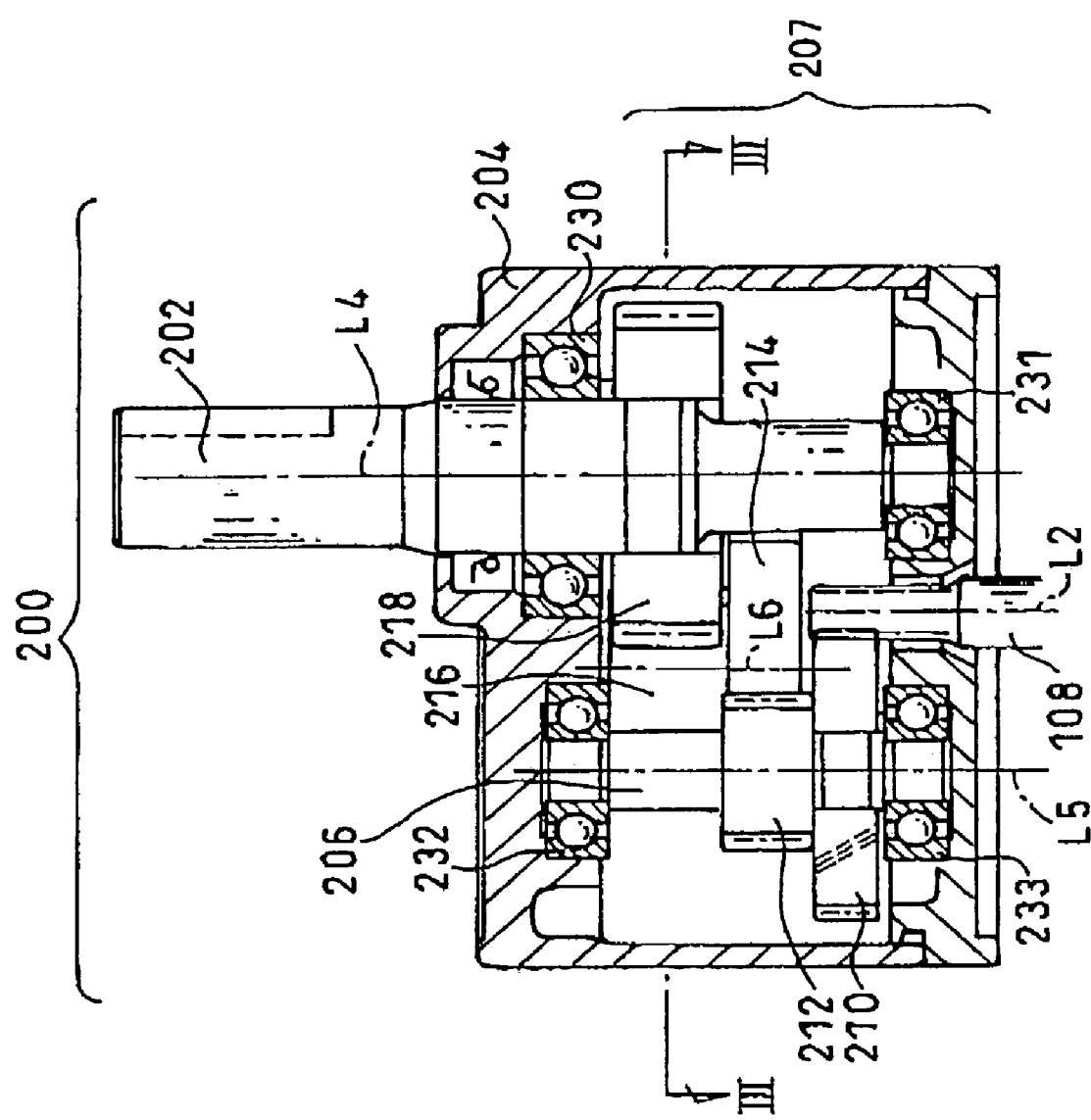
FIG. 2 is a cross-sectional view taken along the line II-II of a rear stage parallel gear head of FIG. 1.
Figure 3:
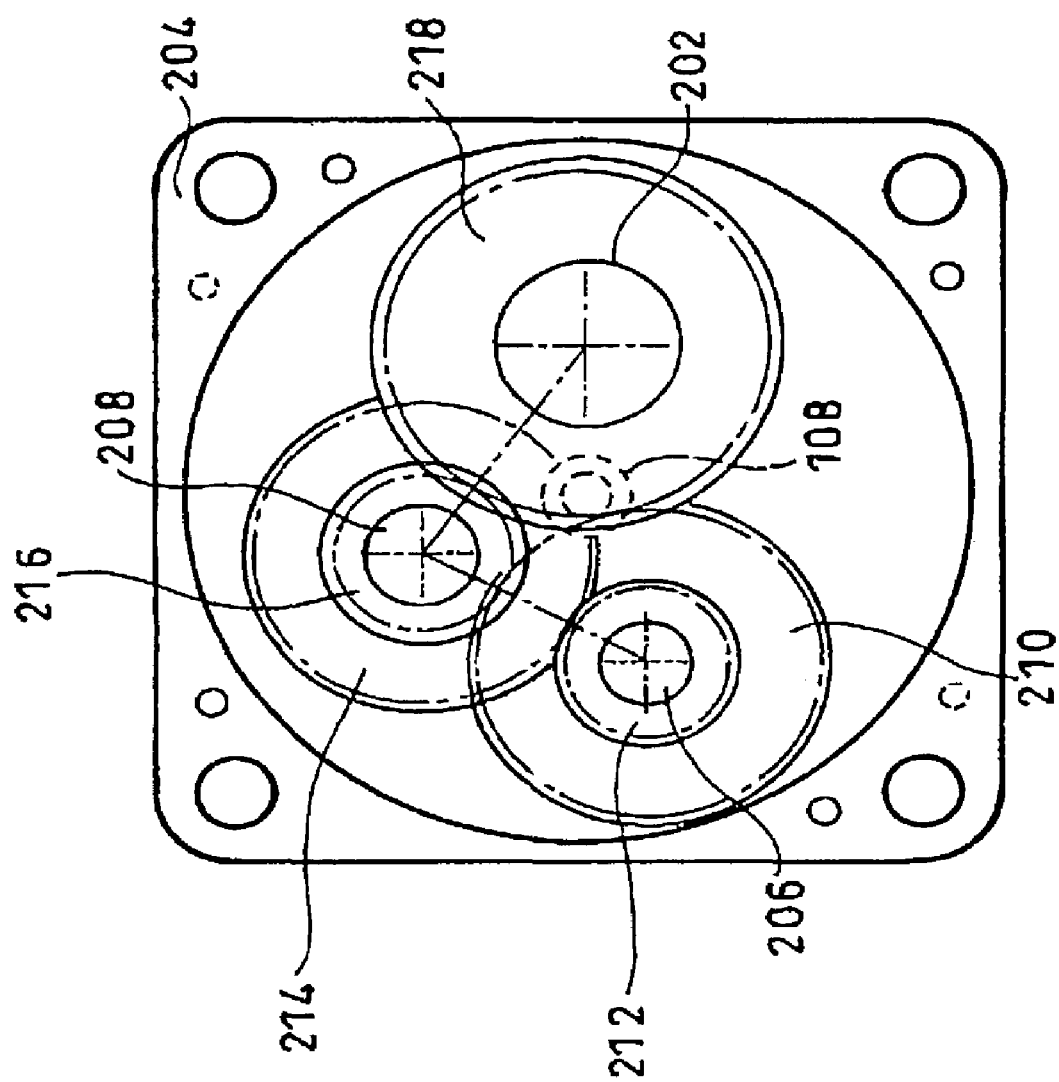
FIG. 3 is a cross-sectional view taken along the line III-III of FIG. 2.

FIG. 2 is a cross-sectional view taken along the line II-II of the rear stage parallel gear head 200 in FIG. 1, FIG. 3 being a cross-sectional view taken along the line III-III of FIG. 2.

The rear stage parallel gear head 200 has a parallel shaft reduction mechanism 207 including an output shaft which acts as a final output shaft (hereinafter simply referred to as the "final output shaft") 202 when the geared motor 500 is formed, and accommodates the parallel shaft reduction mechanism 207 in the single rear stage casing 204. As shown in FIG. 3, the rear stage casing 204 is square in cross section.

The final output shaft 202 is rotationally supported by bearings 230 and 231, and rotates about a shaft line L4. The shaft line L4 is parallel to the shaft line L2 of the intermediate output shaft 108 in the same plane.

The parallel shaft reduction mechanism 207 in the rear stage parallel gear head 200 also includes the final output shaft 202, a first shaft 206 and a second shaft 208.

The first shaft 206 is rotationally supported at its both ends by bearings 232 and 233, and provided with a first rear stage gear 210 having a large diameter rotatable about its shaft line L5 and a second rear stage gear 212 having a small diameter.

The second shaft 208 with its shaft line at a position corresponding to L6 of FIG. 2 behind the figure, is disposed parallel to the first shaft 206. The second shaft 208 is provided with a third rear stage gear 214 and a fourth rear stage gear 216. The third rear stage gear 214 is larger in diameter than the second rear stage gear 212, and engaging with the second rear stage gear 212. The fourth rear stage gear 216 is smaller in diameter than the third rear stage gear 214. The second shaft 208 is rotationally supported at its both ends by bearings (not shown).

The final output shaft 202 of the rear stage parallel gear head 200 is provided with a fifth rear stage gear 218 which engages with the fourth rear stage gear 216.

The intermediate output shaft 108, having an end portion directly toothed, is inserted into the rear stage casing 204 of the rear stage parallel gear head 200, where the intermediate output shaft 108 engages with the first rear stage gear 210 provided on the first shaft 206, thereby constituting an initial-stage gear set for the parallel shaft reduction mechanism 207.

The geared motor 500 according to this embodiment of the present invention is constructed such that the motor shaft 402 is connectedly inserted into the hole 110b provided in the first intermediate gear 110 of the orthogonal transfer mechanism 104 housed in the intermediate orthogonal gear head 100, and the intermediate output shaft 108 of the intermediate orthogonal gear head 100 is inserted into the rear stage casing 204 of the rear stage parallel gear head 200 to mate the first rear stage gear 210.

Now, the operation of the geared motor 500 is described below.

When the motor 400 is activated, the first intermediate gear 110 coupled to the motor shaft 402 rotates about the shaft line L1.

Then, the rotation of the first intermediate gear 110 causes the second intermediate gear 112, orthogonally engaging with the first intermediate gear 110, to rotate about the direction L3 orthogonal to the shaft line L1. As a result, the rotational direction of the power delivered by the motor shaft 402 is changed by 90 degrees.

The rotation of the second intermediate gear 112 causes the third intermediate gear 114 mating the second intermediate gear 112 and the intermediate output shaft 108 having the third intermediate gear 114 attached thereto to rotate about the shaft line L2, which is parallel to the shaft line L3. The rotation transferred from the second intermediate gear 112 is reduced in speed and then delivered to the intermediate output shaft 108.

Furthermore, the rotation of the intermediate output shaft 108 about the shaft line L2 causes the first rear stage gear 210 mating the end portion of the intermediate output shaft 108 and the second rear stage gear 212, provided on the same first shaft 206 as the first rear stage gear 210 is provided, to rotate about the shaft line L5 of the first shaft 206. In this process, the rotation of the intermediate output shaft 108 is reduced in speed by the amount which is proportional to the tooth ratio between the intermediate output shaft 108 and the first rear stage gear 210, and transferred to the second rear stage gear 212.

Thereafter, at the same time the second rear stage gear 212 rotates, the third rear stage gear 214 mating the second rear stage gear 212 and the fourth rear stage gear 216, which is provided on the same second shaft 208 as the third rear stage gear 214 is provided, rotate about the shaft line L6 of the second shaft 208, thereby further reducing the speed of the rotation transferred from the second rear stage gear 212.

Finally, the rotation of the fourth rear stage gear 216 causes the fifth rear stage gear 218 mating the fourth rear stage gear 216 and the final output shaft 202 to rotate, thereby providing power.

Figure 4:
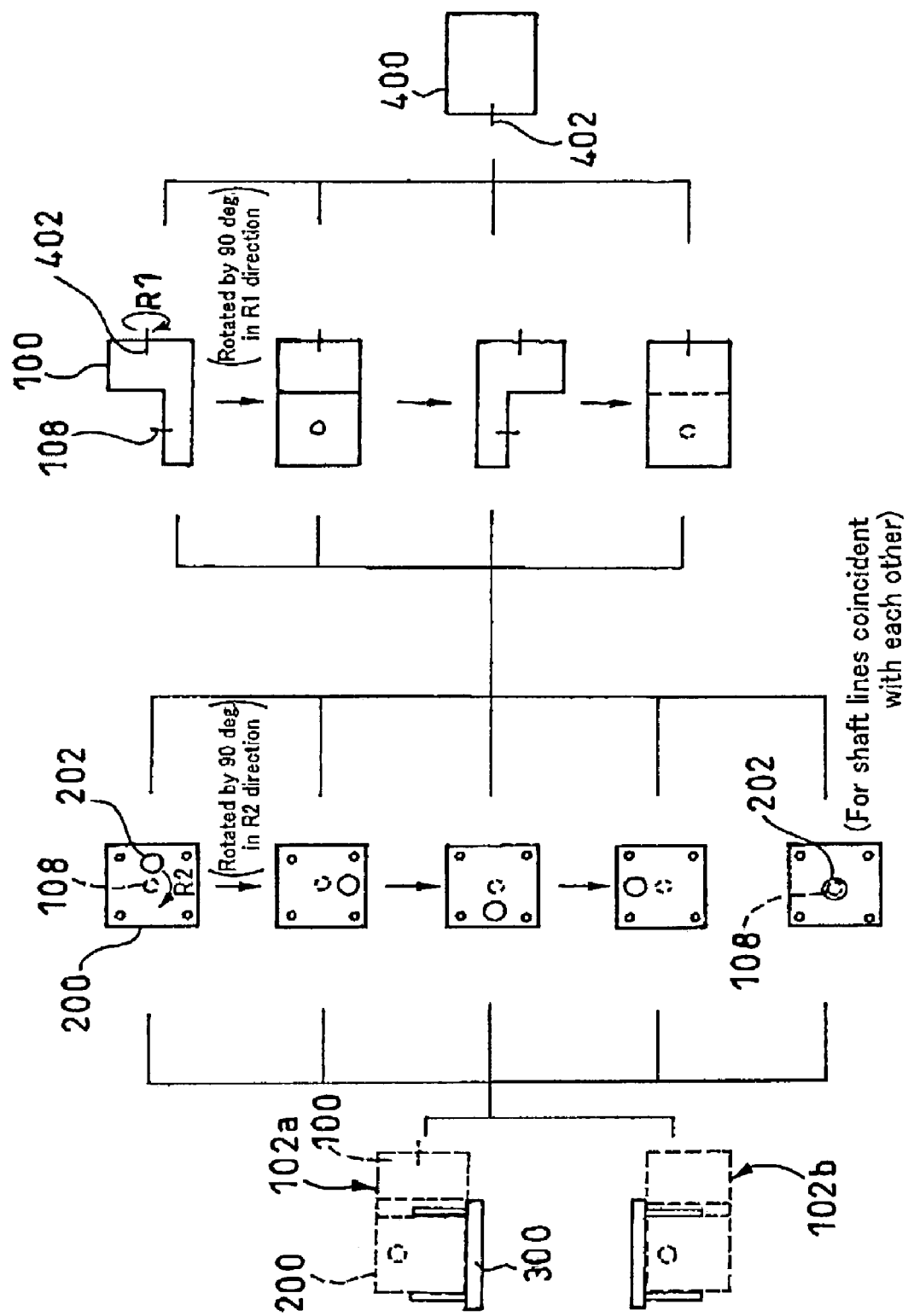
FIG. 4 is a schematic view showing exemplary combinations for use with geared motors according to an embodiment of the present invention.

As schematically shown in FIG. 4, the intermediate orthogonal gear head 100 can be attached to the motor 400 at any one of the positions separated at angular intervals of 90 degrees about the motor shaft 402 along the circumferential direction R1 thereof. On the other hand, the rear stage parallel gear head 200 can also be attached to the intermediate orthogonal gear head 100 at any one of the positions separated at angular intervals of 90 degrees about the intermediate output shaft 108 along the circumferential direction R2 thereof. This allows the direction of the final output shaft 202 of the geared motor 500 to be changed in 16 ways, which in turn makes it possible for the geared motor to be installed according to its application and readily changed. The combination examples shown on the left hand side in FIG. 4 will be discussed later.

In addition, the connection size at the attachment face F1 between the motor 400 and the intermediate orthogonal gear head 100 is designed to be the same as that at the attachment face F2 between the intermediate orthogonal gear head 100 and the rear stage parallel gear head 200. This makes it possible for the rear stage parallel gear head 200 to be directly attached to the motor 400 without the intervention of the intermediate orthogonal gear head 100, thereby enabling a parallel shaft geared motor having a parallel speed reduction function to be readily constructed (see FIG. 14, discussed later).

Furthermore, to implement this specific construction, the intermediate output shaft 108 and the motor shaft 402 are provided with the helical splines in the same module, and the first intermediate gear 110 is provided along the shaft line L1 with the helical female splines for engagingly circumscribing the helical splines on the motor shaft 402 at same speeds.

In other words, since the intermediate output shaft 108 and the motor shaft 402 are provided with the helical splines in the same module, thereby allowing the first rear stage gear 210 of the rear stage parallel gear head 200 to engage not only with the intermediate output shaft 108 but also directly with the motor shaft 402.

As described above, the motor shaft 402 is provided with the helical splines and the first intermediate gear 110 is also provided along the shaft line L1 with the helical female splines for engagingly circumscribing the helical splines on the motor shaft 402 at same speeds. This allows both the motor shaft 402 and the first intermediate gear 110 to have a one-piece construction only by screwing the first intermediate gear 110 over the motor shaft 402.

As a result, together with the compatibility of the connection size, this can make it possible easily without any trouble to couple between the motor 400 and the intermediate orthogonal gear head 100 as well as between the motor 400 and the rear stage parallel gear head 200. The motor shaft 402 and the first intermediate gear 110 can be coupled to each other such that the torque generated by the rotation of the motor shaft 402 causes the first intermediate gear 110 to be screwed (tightened) over the motor shaft 402, thereby precluding loosening of the motor shaft 402 and the first intermediate gear 110.

Since the intermediate orthogonal gear head 100 includes the orthogonal transfer mechanism 104 and the intermediate parallel shaft reduction mechanism 106 and is housed in the intermediate casing 102 having a separate construction, the intermediate orthogonal gear head 100 itself can also be used as a reduction gear for performing orthogonal transfer and speed reduction.

Likewise, since the rear stage parallel gear head 200 includes the parallel shaft reduction mechanism 207 and is housed in the rear stage casing 204 having a separate construction, the rear stage parallel gear head 200 itself can also be used as a reduction gear for performing parallel shaft speed reduction.

As described above, the cross section of the intermediate casing 102 including the input and output shaft lines L1, L2 of the intermediate orthogonal gear head 100 is formed in the shape of a letter L, while a main body of the rear stage casing 204 of the rear stage parallel gear head 200 (the main portion excluding integrated projections or the like) can be accommodated in the space defined by both casing faces 102X, 102Y which include the L-shaped sides 102x and 102y. This allows for providing a generally cubic reduction gear with a reduced number of protuberances, thereby facilitating installation.

Incidentally, it is allowed that at least part of the rear stage casing 204 is accommodated in the space.

Although some part of rear stage casing 204 is projected from the space, it is possible to reduce the whole size of the reduction gear by a volume which is accommodated in the space.

On the other hand, use of the intermediate orthogonal gear head 100 by itself allows part of a driven device (e.g., such as a pulley, sprocket, or gear) to be accommodated in the space defined by both casing faces 102X, 102Y which include the L-shaped sides 102x and 102y, thereby making it possible to save space.

On the other hand, the second intermediate gear 112 provided in the orthogonal transfer mechanism 104 of the intermediate orthogonal gear head 100 engages orthogonally with the first intermediate gear 110 at the one end 112a thereof and is attached in a cantilever manner to the intermediate casing 102 of the intermediate orthogonal gear head 100 at the other end 112b. This construction allows the intermediate casing 102 to receive thrust applied by the first intermediate gear 110.

Furthermore, the first intermediate gear 110 and the second intermediate gear 112 have a bevel gear design, thereby making it possible to reduce the size and cost and increase the efficiency of the intermediate orthogonal gear head 100. Additionally, the first intermediate gear 110 and the second intermediate gear 112 are made of plastics and self-lubricating, thereby eliminating the need for lubricant.

The respective end portions 110a and 112a of the first intermediate gear 110 and the second intermediate gear 112 are each in contact with the intermediate casing 102. This allows the intermediate casing 102 to work also as positioning means for restricting the movement of the first intermediate gear 110 and the second intermediate gear 112 in the direction of their respective shaft center lines L1 and L3.

In the aforementioned embodiment, the first intermediate gear 110 and the second intermediate gear 112, which are disposed in the orthogonal transfer mechanism 104 of the intermediate orthogonal gear head 100, have a bevel gear design. However, the present invention is not limited to this design and may also employ gears such as worm gears or hypoid gears. As discussed later, it is rather preferable to make these gears selectable as applications demand.

On the other hand, the first intermediate gear 110 and the second intermediate gear 112 may not necessarily be made of plastics. Accordingly, for example, they may be formed of a self-lubricating material such as a sintered porous material. Furthermore, they may not necessarily employ a self-lubricating material.

Figure 5:
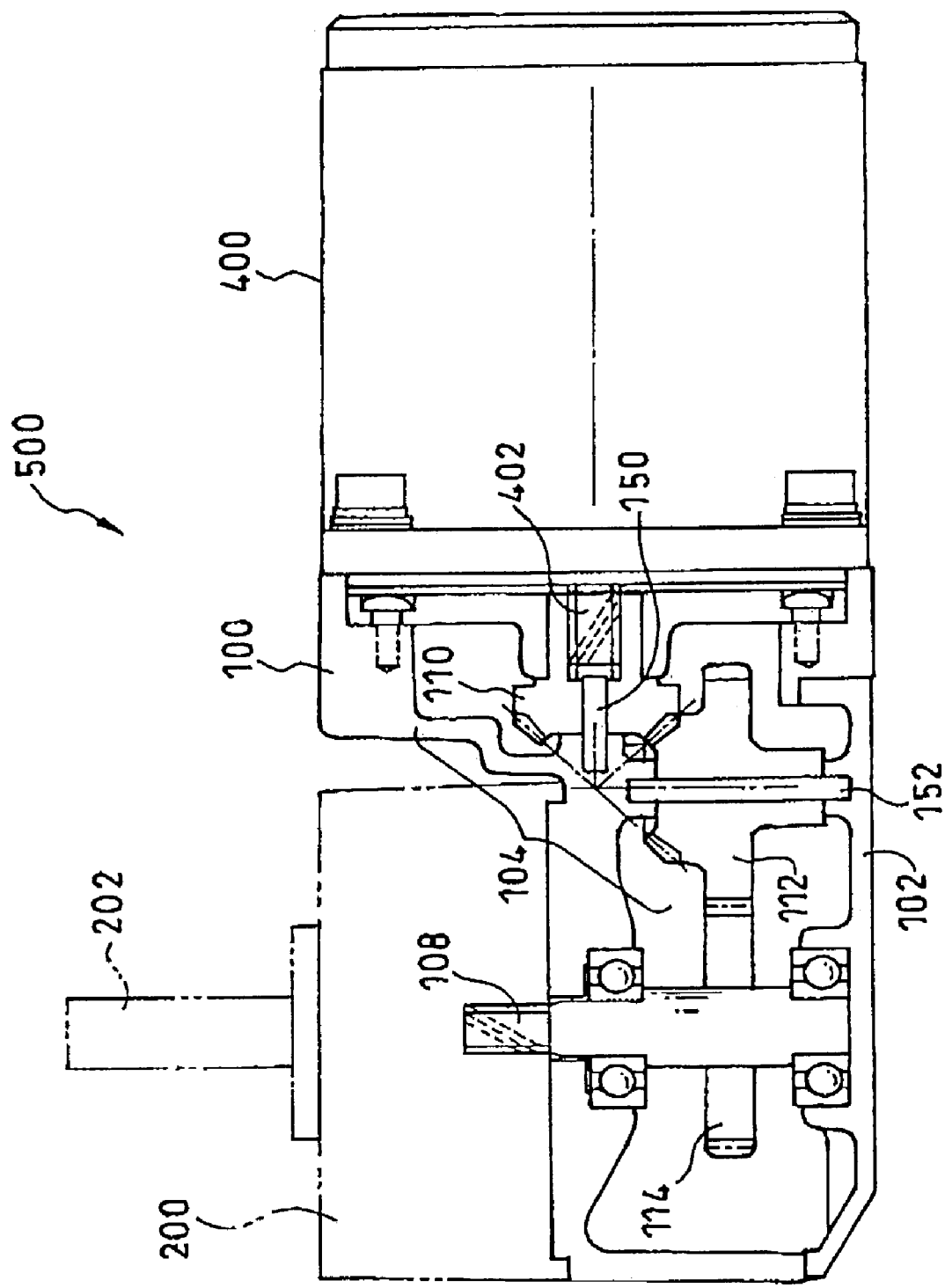
FIG. 5 is a cross-sectional side view showing a geared motor according to a second embodiment of the present invention.

In the aforementioned embodiment, the first intermediate gear 110 and the second intermediate gear 112 are rotationally supported by the bearings 130 to 133, respectively. However, as shown in FIG. 5, pins 150 and 152 may also be press fitted into the intermediate casing 102, thereby allowing the first intermediate gear 110 and the second intermediate gear 112 to be rotatably supported by the pins 150 and 152. Alternatively, the orthogonal transfer mechanism 104 consisting of the first intermediate gear 110 and the second intermediate gear 112 may also be constructed with its both ends supported.

Figure 6:
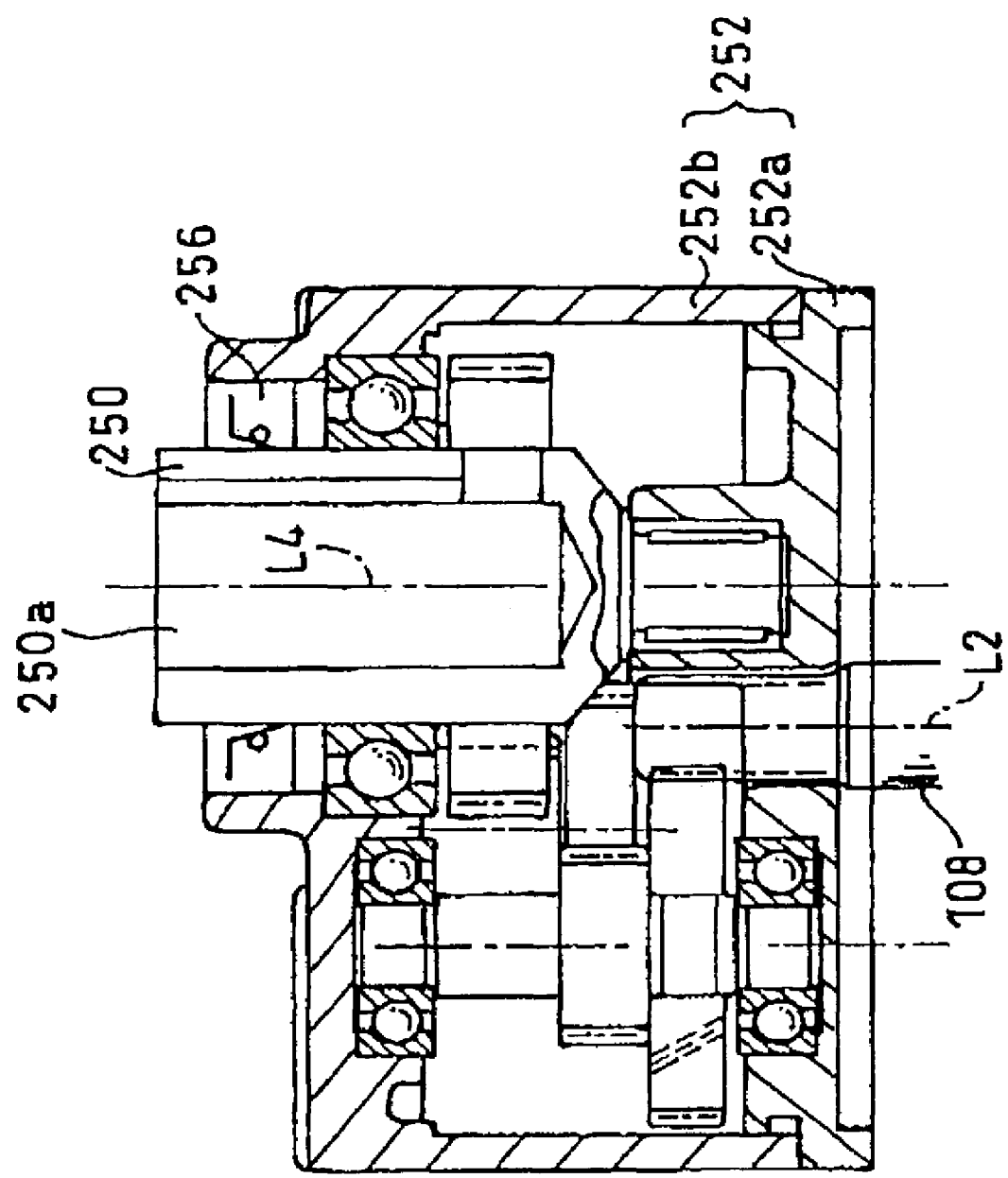
FIG. 6 is a cross-sectional side view showing a rear stage parallel gear head employing a hollow shaft as an output shaft.

In the aforementioned embodiment, the final output shaft 202 is formed of a solid shaft. However, as shown in FIG. 6, it is also possible to employ a hollow shaft 250 having a hollow portion 250a into which a driven shaft is inserted as the final output shaft. This would eliminate the need of a coupling member for use with a counterpart machine, thereby making it possible to reduce a power transmission member and insert the driven shaft into the hollow portion 250a. Thus, even when the geared motor is incorporated into a driven system such as a conveyor belt, it is made possible to reduce the size of the entire system and save space for installation.

On the other hand, with a bottom being provided at one side of the hollow portion 250a in the direction of the shaft line L4 (the lower side in FIG. 6), the one end of the hollow shaft 250 can be accommodated inside a casing 252. This construction makes it possible to support the hollow shaft 250 with no communication with the outside of the casing 252, thereby reducing leakage of a lubricant from inside toward outside of the casing when compared with a hollow portion 250a having a through-hole formed therein. The construction also allows an oil seal 256 to be provided on one side of the hollow shaft 250, thereby making it possible to reduce a burden imposed on the hollow shaft 250, prevent loss in power, and reduce manufacturing cost by reducing the number of components.

The intermediate parallel shaft reduction mechanism 106 in the intermediate orthogonal gear head 100 employs the second intermediate gear 112 and the third intermediate gear 114 to constitute a reduction mechanism, however, the present invention is not limited thereto and need not always to have a speed reduction function. In addition, it is also possible to employ not a gear mechanism but an endless transfer mechanism such as a chain or belt. With an intermediate parallel shaft reduction mechanism formed of an endless transfer mechanism, it is possible to adjust substantially as required the distance between the shaft line L3 of the second intermediate gear 112 and the shaft line L2 of the intermediate output shaft 108. With a belt employed, it is possible to reduce noise and positively make use of a belt slip for torque limitation.

Now, reference is made to FIGS. 7 to 10 to describe an exemplary construction of a geared motor according to another embodiment of the present invention with attention focused on specific mounting materials.

Figure 7:
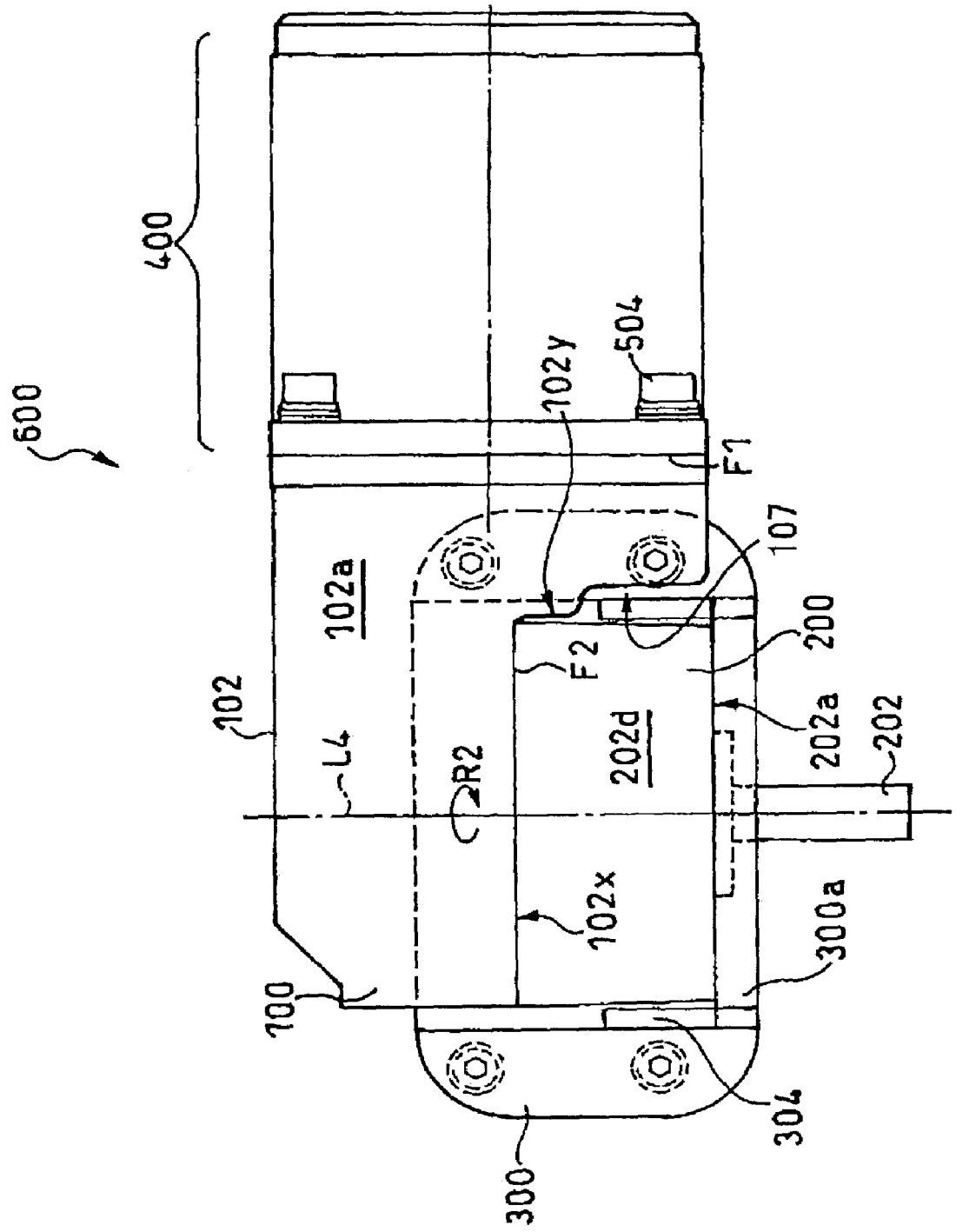
FIG. 7 is a plan view showing a geared motor equipped with a mounting body.
Figure 8:
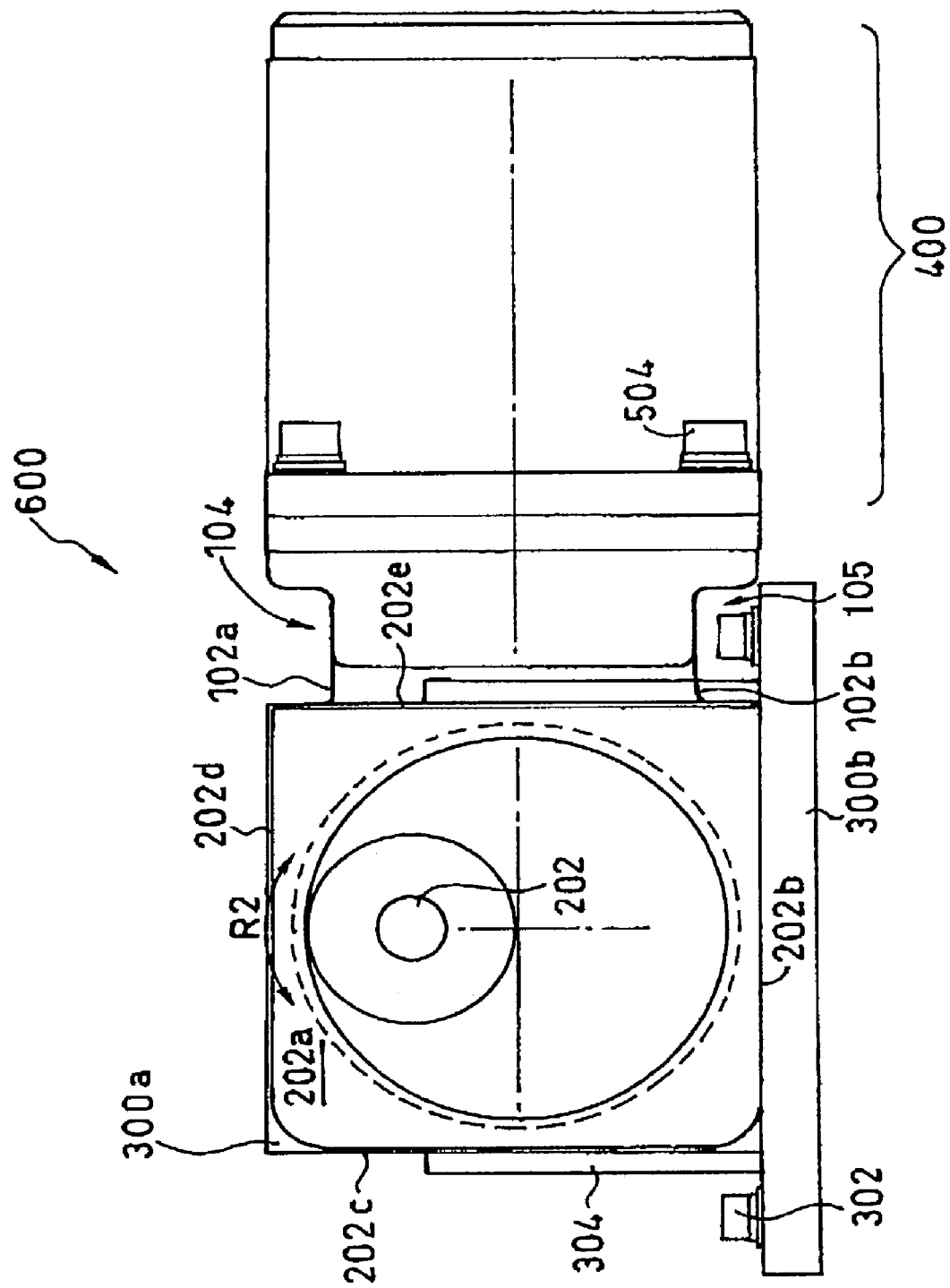
FIG. 8 is a front view showing the geared motor of FIG. 7.
Figure 9:
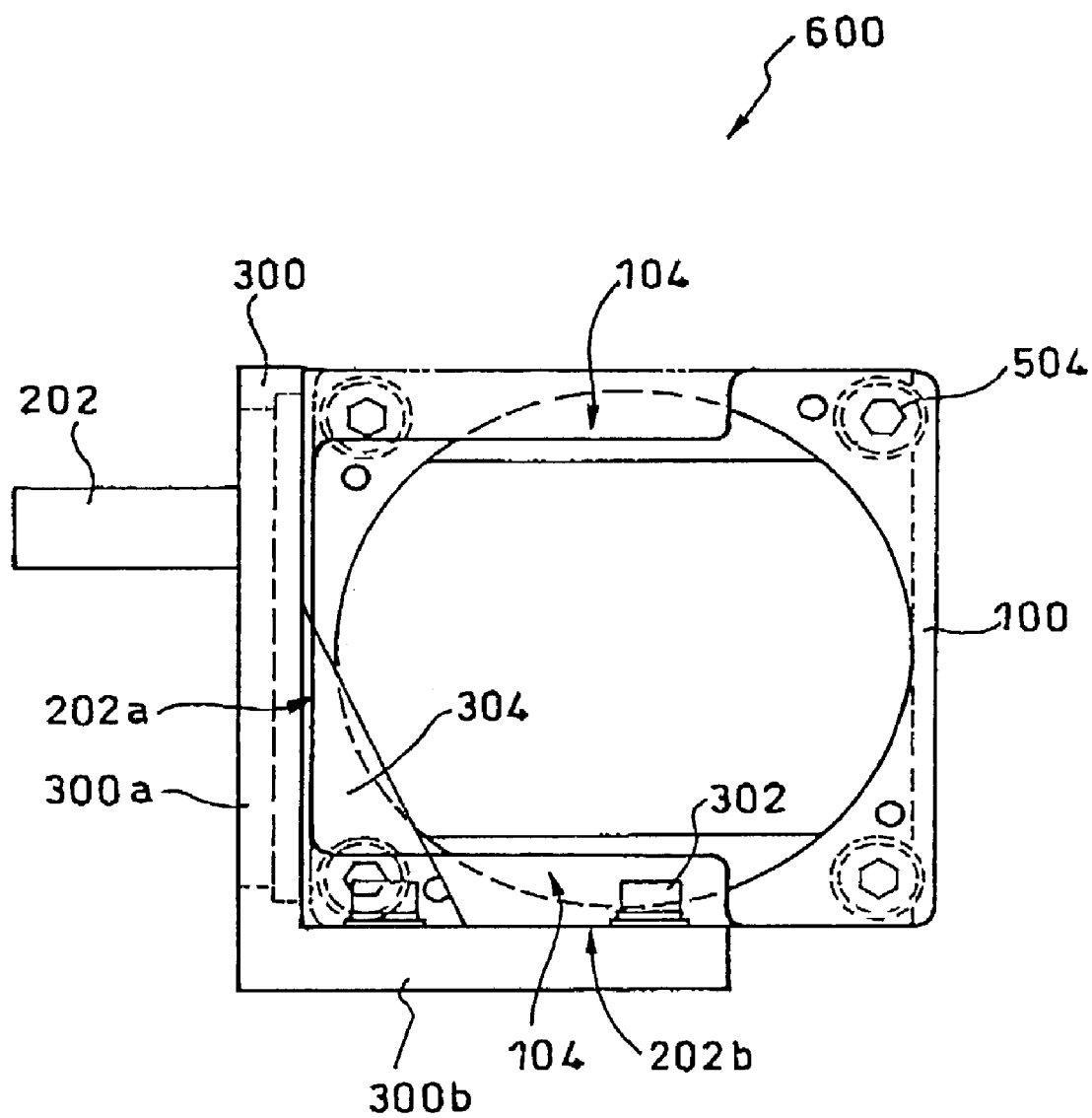
FIG. 9 is a right side view showing the geared motor of FIG. 7.
Figure 10:
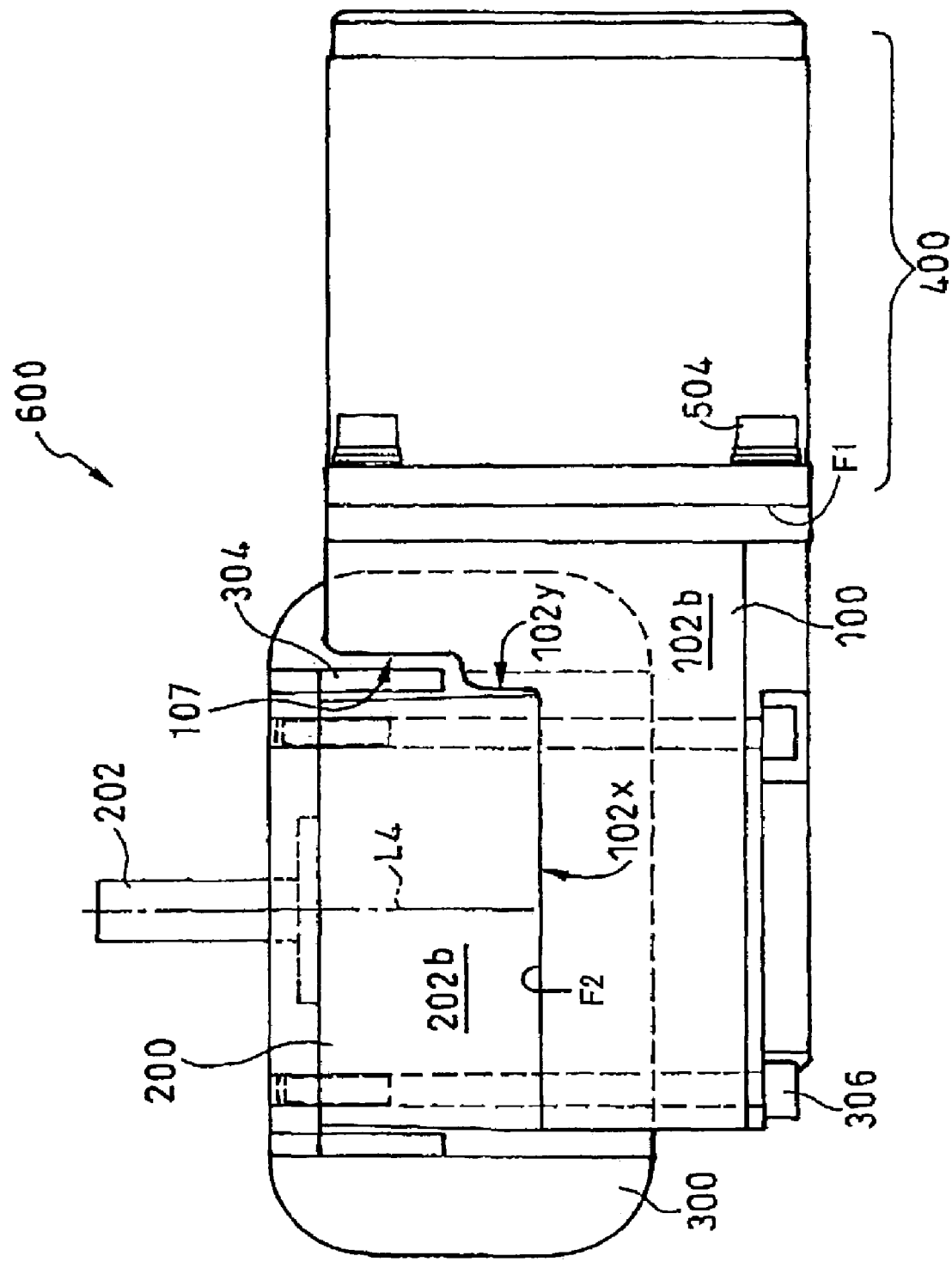
FIG. 10 is a bottom view showing the geared motor of FIG. 7.

FIG. 7 is a plan view showing a geared motor 600 equipped with a mounting body 300, FIG. 8 being a front view, FIG. 9 being a right side view, FIG. 10 being a bottom view, respectively.

The geared motor 600 has the mounting body 300 added to the aforementioned geared motor 500 including the aforementioned motor 400, the intermediate orthogonal gear head 100, and the rear stage parallel gear head 200.

The motor 400 and the intermediate orthogonal gear head 100 are integrally coupled to each other at the attachment face F1 with bolts 504.

On the other hand, as shown in FIG. 10, the parallel gear head 200 has the mounting body 300 attached thereto by means of bolts 306 that penetrate the intermediate orthogonal gear head 100, wherein the mounting body 300 serves to externally install the parallel gear head 200 on a floor or the like.

As described above, the cross section of the intermediate casing 102 including the input and output shaft lines of the intermediate orthogonal gear head 100 is formed in the shape of a letter L, wherein the rear stage parallel gear head 200 with the mounting body 300 attached thereto is accommodated in the space defined by both casing faces 102X, 102Y which include the L-shaped sides 102x and 102y of the intermediate casing 102.

The mounting body 300 or an L-shaped plate member is formed to cover a casing face (hereinafter referred to as the "output shaft side casing face") 202a, from which the output shaft 202 of the rear stage parallel gear head 200 protrudes, and a casing face 202b perpendicular to the output shaft side casing face 202a. There are provided strengthening ribs 304 between two faces 300a and 300b that constitute the L-shaped mounting body 300. On the main body side of the rear stage parallel gear head 200, when viewed from the output shaft side casing face 202a of the rear stage parallel gear head 200, there are provided mounting bolts 302 for securing the mounting body 300 to a fixed member (not shown).

Two L-shaped casing faces 102X and 102Y, which are parallel to the plane including the input and output shaft lines of the intermediate orthogonal gear head 100, are provided with a mounting bolt clearance 105, respectively, which can sufficiently accommodate the two mounting bolts 302, thereby preventing interference with the mounting bolts 302. Additionally, the intermediate casing 102 is also provided with a rib clearance 107 for preventing interference with the ribs 304 for the mounting body 300.

The other configuration is the same in essence as that of the aforementioned geared motor 500.

Now, the operation of the geared motor 600 having the mounting body 300 is described below.

Each of the gears behaves in the same manner as those of the geared motor 500 when activated.

The cross section of the intermediate casing 102 including the input and output shaft lines of the intermediate orthogonal gear head 100 is formed in the shape of a letter L, and the rear stage parallel gear head 200 having a parallel shaft reduction mechanism can be coupled to the intermediate orthogonal gear head 100. This allows the parallel gear head 200 with the mounting body 300 attached thereto to be accommodated in the space defined by both casing faces 102X, 102Y which include the L-shaped sides 102x and 102y of the intermediate casing 102, thereby enabling the entire unit to serve as the geared motor 600 having an orthogonal transfer mechanism. Incidentally, it is allowed at least part of the parallel gear head 200 is accommodated thereby reducing the whole space.

Figure 11:
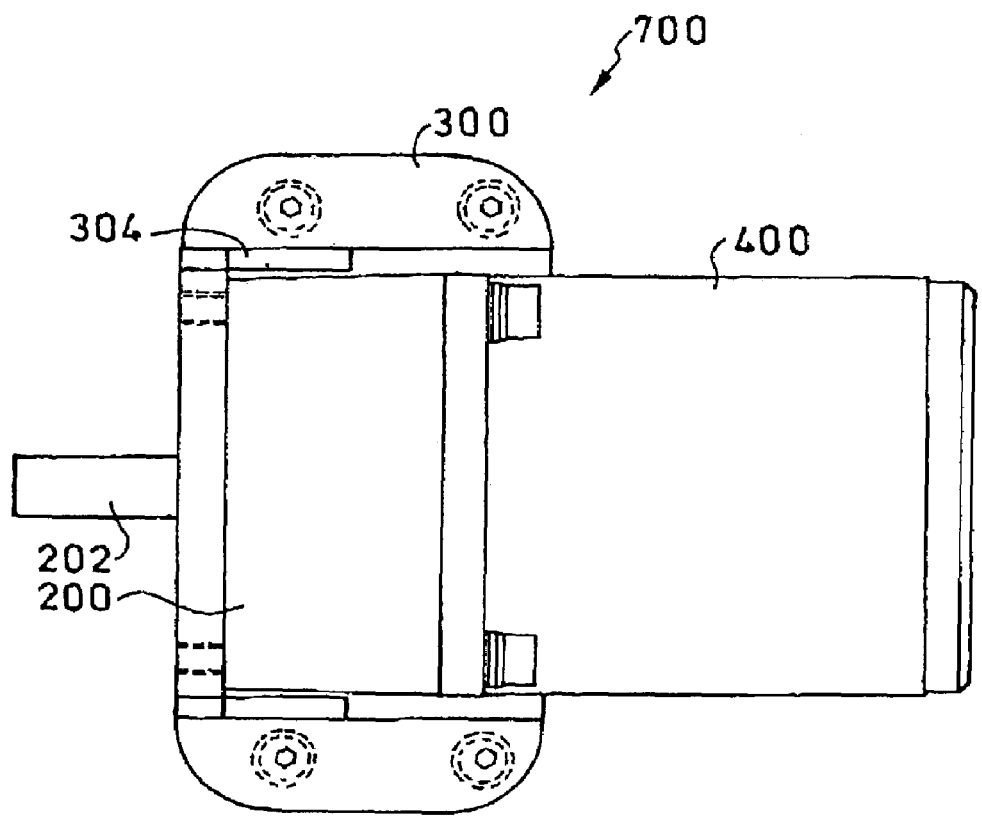
FIG. 11 is a plan view showing a geared motor having a parallel shaft reduction mechanism.
Figure 12:
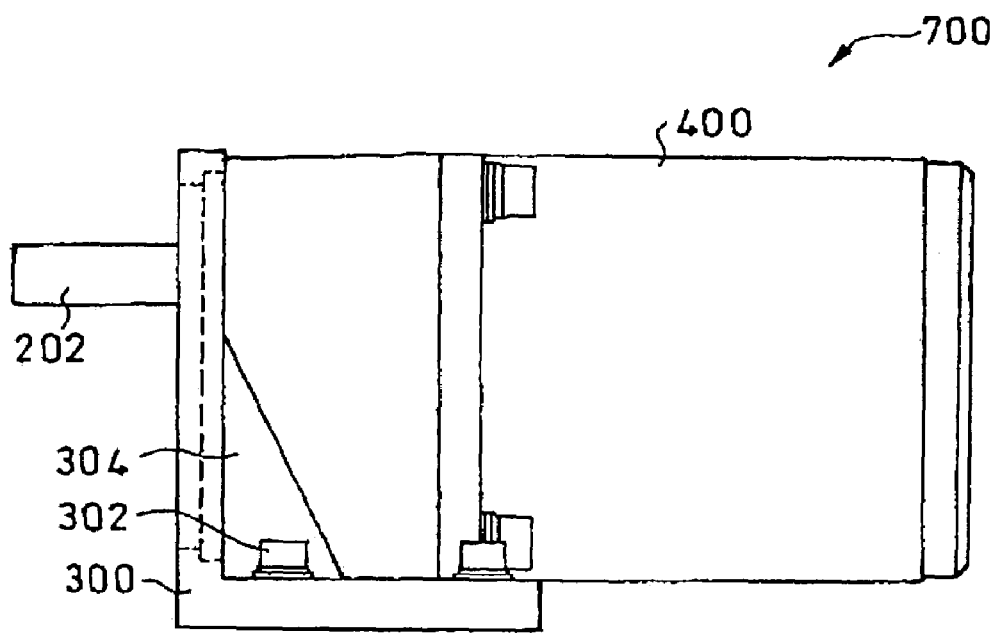
FIG. 12 is a front view showing the geared motor of FIG. 11.

Accordingly, the rear stage parallel gear head 200 and the mounting body 300 can be employed as a component for use with the geared motor 600 having an orthogonal transfer mechanism. As shown in FIGS. 11 and 12, they can also be used as a component for use with a geared motor 700 having a parallel shaft reduction mechanism by making use of the attachment faces F1 and F2 having the same connection size to directly couple the motor 400 (i.e., by allowing the motor shaft 402 to mate the first rear stage gear 210). This makes it possible to provide standardized parts and thereby reduce development cost. FIG. 11 is a plan view showing the geared motor 700 having a parallel shaft reduction mechanism which incorporates the rear stage parallel gear head 200 and the mounting body 300.

The mounting bolts 302 for securing the mounting body 300 are disposed on the main body side of rear stage parallel gear head 200, when viewed from the output shaft side casing face 202a of the rear stage parallel gear head 200. This configuration allows the geared motor 600 to be placed near a driven device without allowing the mounting bolts 302 to protrude towards the driven device, thus saving space for installation. The mounting bolt clearance 105 provided in the intermediate casing 102 of the intermediate orthogonal gear head 100 makes it possible to prevent interference with the mounting bolts 302 of the mounting body 300.

The mounting body 300 or an L-shaped plate member which is formed so as to cover the output shaft side casing face 202a of the rear stage parallel gear head 200 and the casing face 202b perpendicular to the casing face 202a allows the geared motor 600 to be installed with stability. Additionally, the strengthening ribs 304 provided between the two faces 300a and 300b, which constitute the mounting body 300, improve the installation strength of the geared motor 600. The rib clearance 107 provided on the intermediate casing. 102 of the intermediate orthogonal gear head 100 prevents interference with the strengthening ribs 304.

Figure 13:
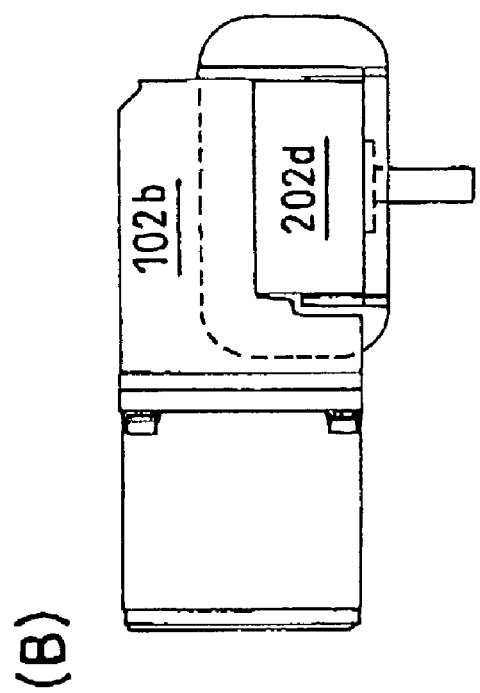
FIGS. 13(A) and 13(B) are views showing an example of installing the geared motor of FIG. 7.
Figure 13:
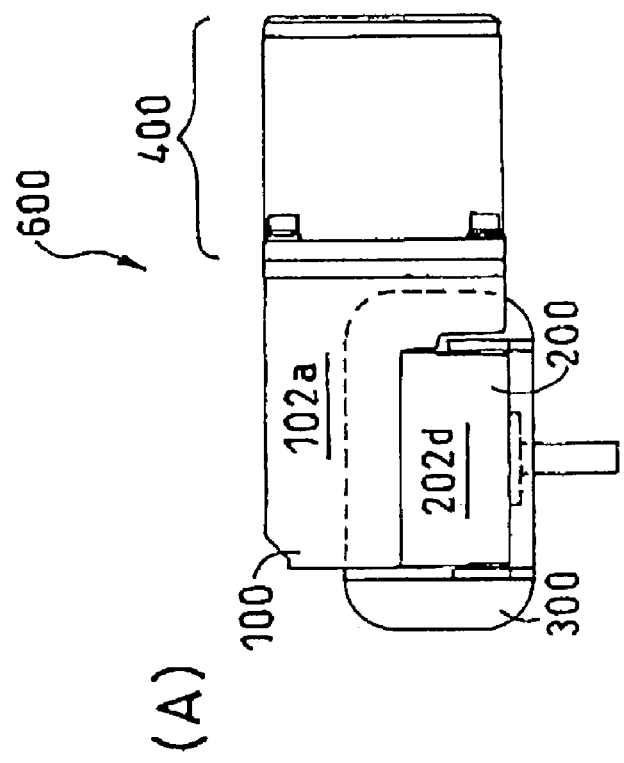

The two L-shaped casing faces 102a and 102b, which are parallel to the plane including the input and output shaft lines of the intermediate orthogonal gear head 100, are provided with a mounting bolt clearance 105, respectively. Additionally, the rear stage parallel gear head 200 is also attached to the intermediate orthogonal gear head 100 at any one of the positions separated at angular intervals about the intermediate output shaft 108 along the circumferential direction R2 thereof. As shown in FIG. 13(A), this arrangement allows the casing face 102a of the orthogonal gear head 100 to serve as an upper face and the casing face 102b to serve as an installation face (bottom face). As shown in FIG. 13(B), this arrangement also allows the casing face 102b to serve as an upper face and the casing face 102a to serve as an installation face (bottom face). Accordingly, the geared motor 600 can be installed according to its application. In addition to the combination described above, the intermediate orthogonal gear head 100, the rear stage parallel gear head 200, and the mounting body 300 can also be combined in a variety of ways schematically shown on the left hand side in FIG. 4 mentioned above, thereby allowing the geared motor 600 (or 500) to be placed according to the installation site.

In this embodiment, the rear stage parallel gear head 200 is formed in a size just to fit in the L-shaped space of the intermediate orthogonal gear head 100, and provided are additional "recessed portions" in the intermediate casing 102, or the mounting bolt clearance 105 and the rib clearance 107. This is intended to make use of a space where no gears are present since an orthogonal reduction mechanism 114 is present partially at the central portion of the intermediate casing 102. That is, the presence of the clearances 105 and 107 enables the geared motor 600 to be externally secured on a floor or the like without an increase in the entire size of the geared motor 600 and without allowing the mounting bolts 302 to protrude from main body of the geared motor 600.

In the aforementioned embodiment, the mounting body 300 is formed in the shape of a letter L. However, for example, the mounting body 300, formed of a plate-shaped member, may be attached to any one of the four casing faces 202b, 202c, 202d, and 202e, which are parallel to the shaft line L2 of the rear stage parallel gear head 200, thereby allowing the geared motor 600 to be installed by means of the mounting body.

The mounting bolt clearance 105 is large enough to accommodate two mounting bolts 302, however, its size is not limited thereto.

Now, described below are series (product group) of geared motors provided in combination of the aforementioned intermediate orthogonal gear head 100, the rear stage parallel gear head 200, and the motor 400. Those geared motors having the mounting body 300 can also be provided in the same series.

Figure 14:
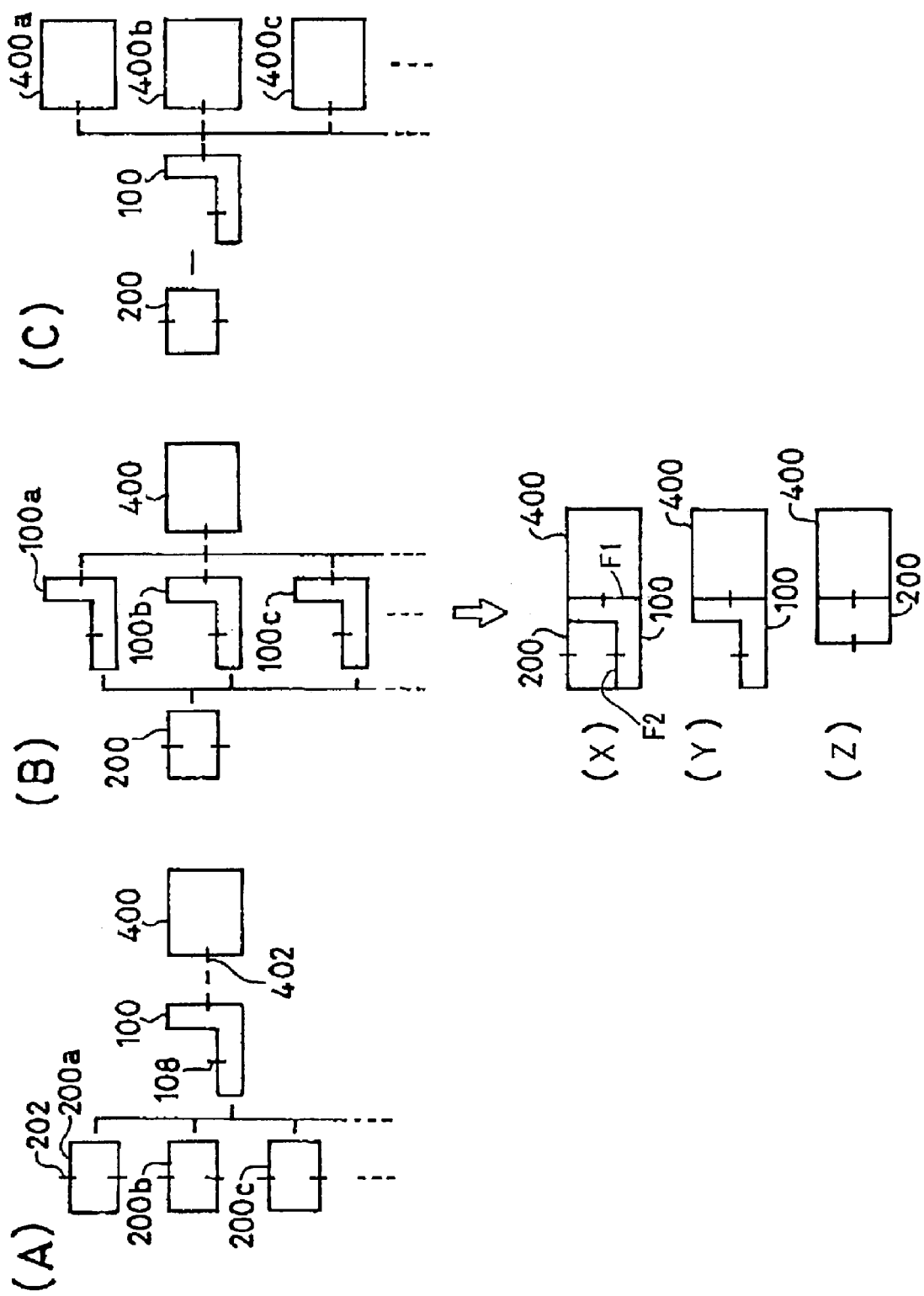
FIG. 14 is a schematic view showing a series of geared motors according to an embodiment of the present invention.

FIG. 14 illustrates schematically an exemplary series of geared motors in combination of the motor 400, the intermediate orthogonal gear head 100, and the rear stage parallel gear head 200, in which two or more types of at least one of the motor 400, the intermediate orthogonal gear head 100, and the rear stage parallel gear head 200 are prepared to be replaceable.

The (A) of FIG. 14 shows a series of geared motors with multiple types of rear stage parallel gear heads 200a, 200b, 200c, and so on for one type of the motor 400 and the intermediate orthogonal gear head 100.

Providing such series allows the user to select any one type of the rear stage parallel gear heads 200 according to the user's application for one type of the motor 400 and the intermediate orthogonal gear head 100.

(B) of FIG. 14 shows a series of geared motors with multiple types of intermediate orthogonal gear heads 100a, 100b, 100c, and so on for one type of the motor 400 and the rear stage parallel gear head 200. (C) of FIG. 14 shows a series of geared motors with multiple types of motors 400a, 400b, 400c, and so on for one type of the intermediate orthogonal gear head 100 and the rear stage parallel gear head 200.

Such series also allow the user to select any one type of the multiple types of the intermediate orthogonal gear heads 100a, 100b, 100c, and so on, or the geared motors with multiple types of motors 400a, 400b, 400c, and so on, according to the user's application.

Providing such series also allows reduction gear makers or the like to standardize the device. This makes it possible to reduce delivery lead times and product stocks as well as development cost and the price of the reduction gear.

(X) to (Z) in FIG. 14 correspond to an exemplary structure of a geared motor.

That is, the motor 400, the intermediate orthogonal gear head 100, and the rear stage parallel gear head 200 can be integrally coupled to each other, thereby allowing an orthogonal shaft type geared motor to be formed as shown at (X) in FIG. 14 in which the power of the motor 400 is orthogonally changed and then delivered.

Alternatively, since only the motor 400 and the intermediate orthogonal gear head 100 can form a geared motor, the motor 400 and the intermediate orthogonal gear head 100 can be integrally coupled to each other, thereby allowing an orthogonal shaft type geared motor to be provided as shown at (Y) in FIG. 14 in which the power of the motor 400 is orthogonally changed and then delivered.

Furthermore, as described above, the connection size at the attachment face F1 between the motor 400 and the intermediate orthogonal gear head 100 is the same as that at the attachment face F2 between the intermediate orthogonal gear head 100 and the rear stage parallel gear head 200. This allows the rear stage parallel gear head 200 to be directly attached to the motor 400 without the intervention of the intermediate orthogonal gear head 100, thereby making it possible to form a geared motor only of the motor 400 and the rear stage parallel gear head 200. Thus, it is possible to provide a parallel shaft type geared motor, shown at (Z) in FIG. 14, in which the rotational speed of the motor 400 is reduced and then delivered.

Figure 15:
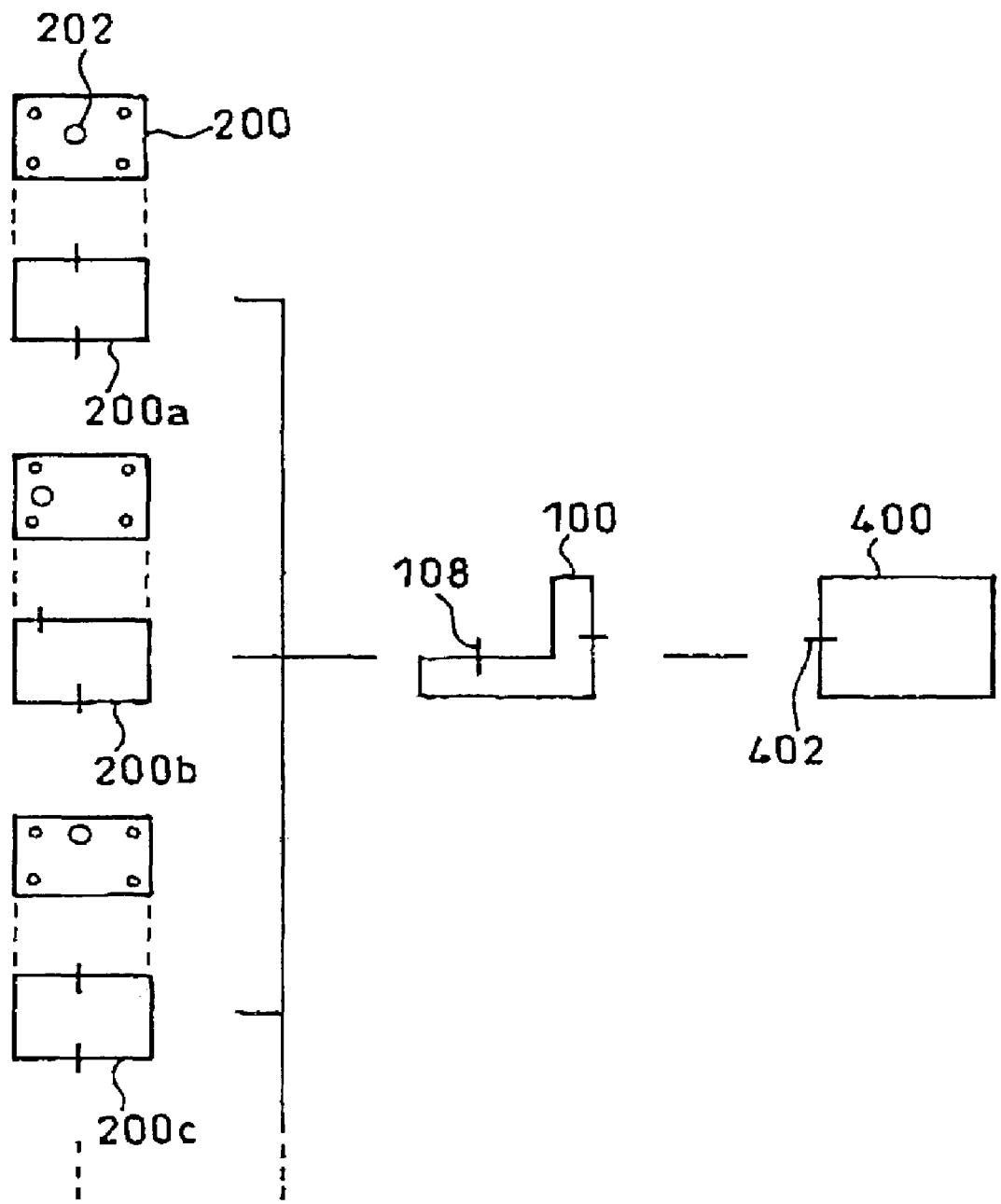
FIG. 15 is a schematic view showing a series of geared motors wherein multiple positions of shaft lines of a final output shaft are prepared.

FIG. 15 illustrates an exemplary series of geared motors, wherein multiple rear stage parallel gear heads 200 are prepared which have mutually different positions of shaft lines of the final output shaft 202 in the rear stage parallel gear head 200 with respect to the rear stage casing 204. The series allows the user to select a shaft line of the final output shaft 202 from a variety types, thereby making it possible to form a geared motor according to its application.

Figure 16:
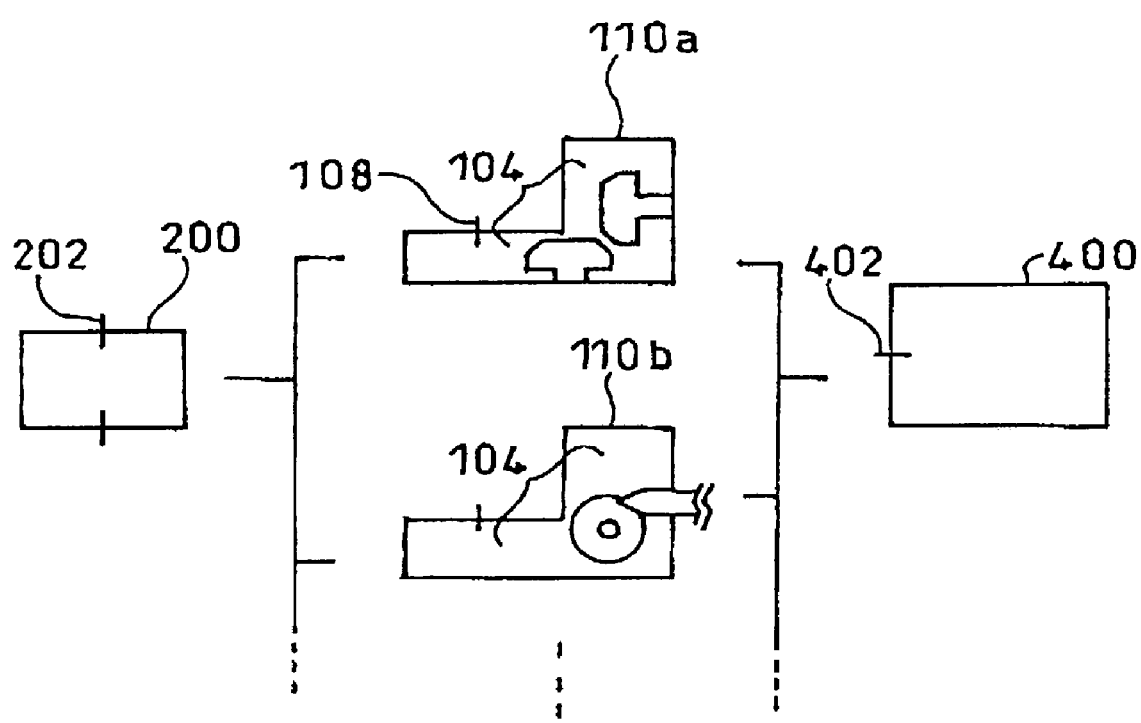
FIG. 16 is a schematic view showing a series of geared motors wherein multiple orthogonal transfer mechanisms of an intermediate orthogonal gear head are prepared.

FIG. 16 illustrates a series of geared motors in which at least two types of a bevel gear, a worm gear, and a hypoid gear (the bevel gear and the hypoid gear in this example) are provided so as to make at least one type of the two types selectable as a component for use in the orthogonal transfer mechanism 104 of the intermediate orthogonal gear head 100. This series allows the user to select a gear design according to cost and applications, thereby making it possible to meet a wide variety of user needs.

Figure 17:
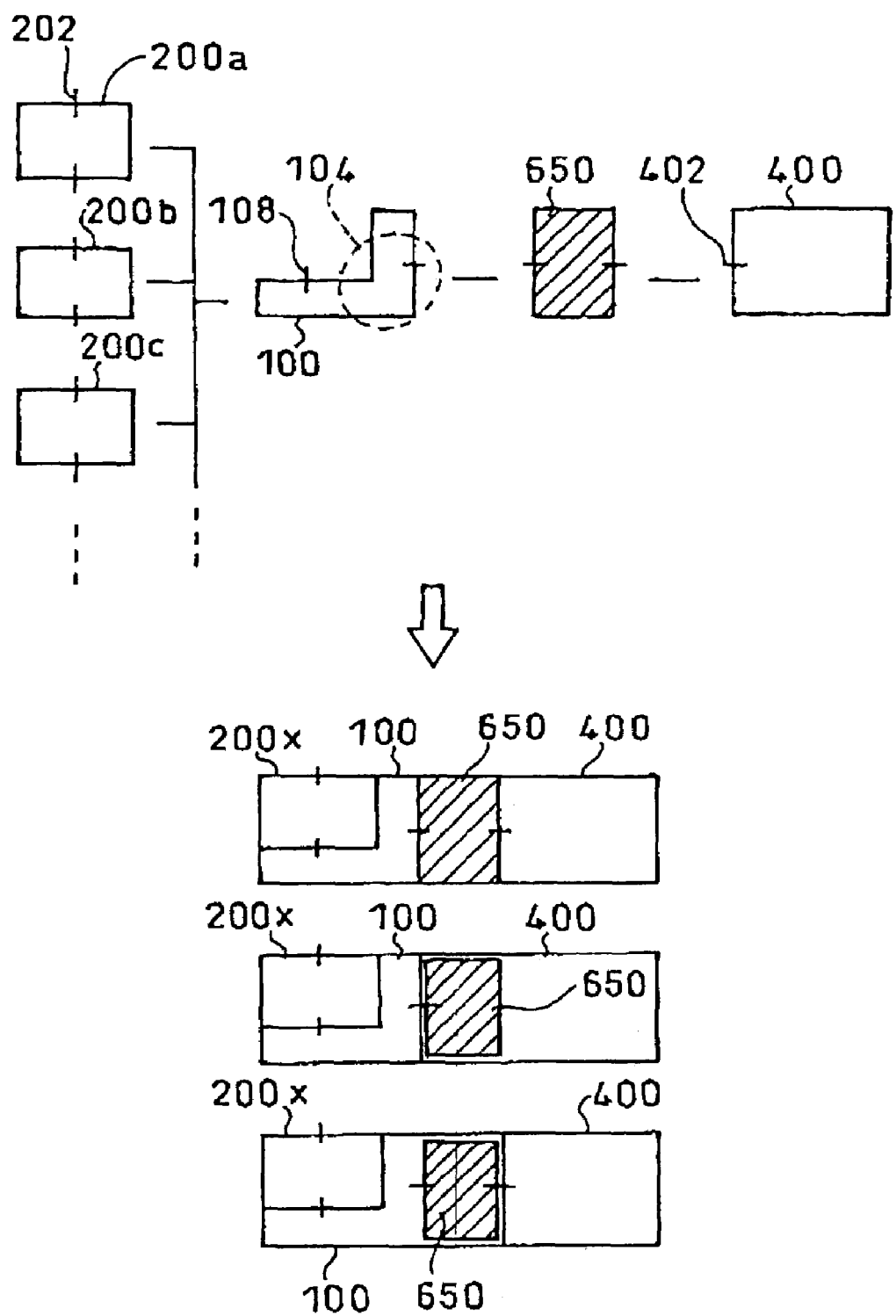
FIG. 17 is a schematic view showing a series of geared motors in which a front stage parallel shaft reduction mechanism is allowed to be interposed.

As shown in FIG. 17, such a series of geared motors may also be provided in which a front stage parallel shaft reduction mechanism 650 can be interposed between the motor shaft 402 of the motor 400 and the orthogonal transfer mechanism 104 of the intermediate orthogonal gear head 100.

On the other hand, the aforementioned reduction gears and motors may be selected and combined not to encompass all the types included in a specific series of geared motors. In other words, reduction gears and motors may be selected and combined (or possibly combined) to sufficiently provide an arrangement according to the present invention for some types of geared motors included in the aforementioned specific series.

According to the present invention, it is possible to provide a reduction gear for use with a geared motor, a geared motor, and its product group, which facilitates the selective combination of a reduction gear and a motor and can be used flexibly and strategically according to its application.

What is claimed is:

1. A reduction gear for a geared motor, the reduction gear comprising:
    an intermediate orthogonal gear head having an orthogonal transfer mechanism for changing a rotational direction of power delivered from a motor into an orthogonal direction, the intermediate orthogonal gear head housing the orthogonal transfer mechanism and all bearings which support shafts of the orthogonal transfer mechanism in a separate intermediate casing from the motor; and a rear stage parallel gear head having a parallel shaft reduction mechanism including an output shaft serving as a final output shaft of the geared motor, the rear stage parallel gear head being directly connectable to a rear stage of the intermediate orthogonal gear head, the rear stage parallel gear head also being directly connectable to the motor, the rear stage parallel gear head housing the parallel shaft reduction mechanism and all bearings which support the shafts of the parallel shaft reduction mechanism in a separate rear stage casing from the intermediate orthogonal gear head.

2. The reduction gear for a geared motor according to claim 1, wherein the rear stage parallel gear head is mountable at angular intervals of 90 degrees about an output shaft of the intermediate orthogonal gear head along a circumferential direction of the output shaft.

3. The reduction gear for a geared motor according to claim 1, the intermediate orthogonal gear head further comprising:

a first intermediate gear rotatable about an input shaft line of the intermediate orthogonal gear head; and a second intermediate gear orthogonal to and engageable with the first intermediate gear, wherein at least part of the first intermediate gear and the second intermediate gear is in contact with the intermediate casing, respectively.

4. The reduction gear for a geared motor according to claim 3, wherein the first intermediate gear and the second intermediate gear comprise a self-lubricating material.

5. The reduction gear for a geared motor according to claim 1, wherein the intermediate orthogonal gear head further comprises a first intermediate gear rotatable about an input shaft line of the intermediate orthogonal gear head, and the first intermediate gear includes a hole receiving an output shaft of the motor along a shaft line of the first intermediate gear, and an inner diameter of the hole has helical female splines formed to couple between the motor output shaft and the first intermediate gear.

6. The reduction gear for a geared motor according to claim 1, further comprising:

a hollow shaft having a hollow portion for inserting a driven shaft therein, said hollow shaft comprising an output shaft of the rear stage parallel gear head.

7. The reduction gear for a geared motor according to claim 1, wherein the intermediate orthogonal gear head has an intermediate parallel shaft reduction mechanism for transferring rotational output from the orthogonal transfer mechanism, and a cross section of an intermediate casing including input and output shaft lines of the intermediate orthogonal gear head comprising a shape of a letter L.

8. The reduction gear for a geared motor according to claim 7, wherein the intermediate orthogonal gear head and the rear stage parallel gear head are coupled to each other such that a main body of the rear stage casing of the rear stage parallel gear head is accommodated in a space defined by both casing faces which include the L-shaped sides of the intermediate casing of the intermediate orthogonal gear head.

9. The reduction gear for a geared motor according to claim 7, wherein the intermediate orthogonal gear head and the rear stage parallel gear head are coupled to each other such that at least part of the rear stage casing of the rear stage parallel gear head is accommodated in a space defined by both casing faces which include the L-shaped sides of the intermediate casing of the intermediate orthogonal gear head.

10. The reduction gear for a geared motor according to claim 7, the reduction gear further comprising a mounting body attached thereto for installing the geared motor, wherein the intermediate orthogonal gear head and the rear stage parallel gear head can be integrally coupled to each other, with the rear stage casing of the rear stage parallel gear head comprising the mounting body.

11. The reduction gear for a geared motor according to claim 10, further comprising a mounting bolt for externally securing the mounting body, wherein the mounting bolt is disposed on a main body side of the rear stage parallel gear head, when viewed from a casing face having an output shaft of the rear stage parallel gear head protruded therefrom, and an intermediate casing of the intermediate orthogonal gear head is provided with a mounting bolt clearance for preventing interference with the mounting bolt.

12. The reduction gear for a geared motor according to claim 11, wherein the mounting bolt clearance is provided on two L-shaped casing faces parallel to a plane including the input and output shaft lines of the intermediate orthogonal gear head, respectively.

13. The reduction gear for a geared motor according to claim 10, wherein the mounting body comprises an L-shaped plate member formed to cover a casing face having the output shaft of the rear stage parallel gear head protruding therefrom or either one of four casing faces perpendicular to the casing face.

14. The reduction gear for a geared motor according to claim 13, further comprising:

a rib provided between two faces constituting the L-shaped mounting body; and a rib clearance provided on the orthogonal gear head casing to prevent interference with the rib.

15. The reduction gear for a geared motor according to claim 10, wherein the mounting body comprises a plate-shaped member, and the mounting body is mountable to any one of four casing faces parallel to the input and output shaft lines of the rear stage parallel gear head.

16. A geared motor having a motor and a reduction gear, the reduction gear comprising:

an intermediate orthogonal gear head comprising an orthogonal transfer mechanism for changing a rotational direction of power delivered from the motor into an orthogonal direction, the intermediate orthogonal gear head housing the orthogonal transfer mechanism and all bearings which support shafts of the orthogonal transfer mechanism in a separate intermediate casing from the motor; and a rear stage parallel gear head having a parallel shaft reduction mechanism including an output shaft serving as a final output shaft of the geared motor, the rear stage parallel gear head being directly connectable to a rear stage of the intermediate orthogonal gear head, the rear stage parallel gear head also being directly connectable to the motor, the rear stage parallel gear head housing the parallel shaft reduction mechanism and all bearings which support the shafts of the parallel shaft reduction mechanism in a separate rear stage casing from the intermediate orthogonal gear head.

17. The geared motor according to claim 16, wherein the intermediate orthogonal gear head of the reduction gear is mountable at angular intervals of 90 degrees about an output shaft of the motor in a circumferential direction of the output shaft.

18. The geared motor according to claim 16, wherein a connection size between the intermediate orthogonal gear head and the rear stage parallel gear head is the same as a connection size between the intermediate orthogonal gear head and the motor.

19. The geared motor according to claim 18, wherein helical splines are formed in the same module on the output shaft of the motor and the output shaft of the intermediate orthogonal gear head.

20. A geared motor product group including geared motors as components thereof, each geared motor comprising:
a motor;
an intermediate orthogonal gear head having an orthogonal transfer mechanism for changing a rotational direction of power delivered from the motor into an orthogonal direction, the intermediate orthogonal gear head housing the orthogonal transfer mechanism and all bearings which support shafts of the orthogonal transfer mechanism in a separate intermediate casing from the motor; and
a rear stage parallel gear head having a parallel shaft reduction mechanism including an output shaft serving as a final output shaft of the geared motor when the geared motor is formed, the rear stage parallel gear head being directly connectable to a rear stage of the intermediate orthogonal gear head, the rear stage parallel gear head also being directly connectable to the motor, the rear stage parallel gear head housing the parallel shaft reduction mechanism and all bearings which support the shafts of the parallel shaft reduction mechanism in a separate rear stage casing from the intermediate orthogonal gear head, wherein
the motor is directly connectable to at least one of the intermediate orthogonal gear head, and the rear stage parallel gear head.

21. A geared motor product group according to claim 20, wherein
at least one of the motor and the rear stage parallel gear head are selectively replaceable with at least another motor and rear stage parallel gear head, respectively.

22. A geared motor product group according to claim 20, wherein
at least one of the motor and the intermediate orthogonal gear head are selectively replaceable with at least another motor and intermediate orthogonal gear head, respectively.

23. The geared motor product group according to claim 20, wherein
multiple rear stage parallel gear heads are provided which have mutually different positions of shaft lines of an output shaft of the rear stage parallel gear head with respect to the rear stage casing.

24. The geared motor product group according to claim 20, wherein
at least two of a bevel gear, a worm gear, and a hypoid gear are provided so as to make at least one of the at least two gears selectable as a component for use in the orthogonal transfer mechanism of the intermediate orthogonal gear head.

25. The geared motor product group according to claim 20, wherein
a front stage parallel shaft reduction mechanism can be further interposed between the output shaft of the motor and the orthogonal transfer mechanism of the intermediate orthogonal gear head.

26. A reduction gear having an orthogonal transfer mechanism, comprising
an intermediate orthogonal gear head in which the orthogonal transfer mechanism for changing a rotational direction of input power into an orthogonal direction and an intermediate parallel shaft transfer mechanism for transferring rotational output of the orthogonal transfer mechanism are accommodated in a casing formed in a shape of a letter L in cross section including input and output shaft lines of the orthogonal transfer mechanism,
a rear stage parallel gear head in which a parallel shaft reduction mechanism capable of transferring output from the intermediate parallel shaft transfer mechanism is accommodated in a rear stage casing, most part of the rear stage casing being accommodated in a space defined by both casing faces which include the L-shaped sides of an intermediate casing of the intermediate orthogonal gear head, and,
a mounting body for installing the reduction gear concerned, wherein
the intermediate orthogonal gear head and the rear stage parallel gear head are integrally coupled to each other, with the mounting body attached to the rear stage parallel gear head casing.

* * * * *